Jan. 31, 1939.   E. SCHERMERHORN   2,145,405
SHEAR BLADE
Filed April 19, 1937
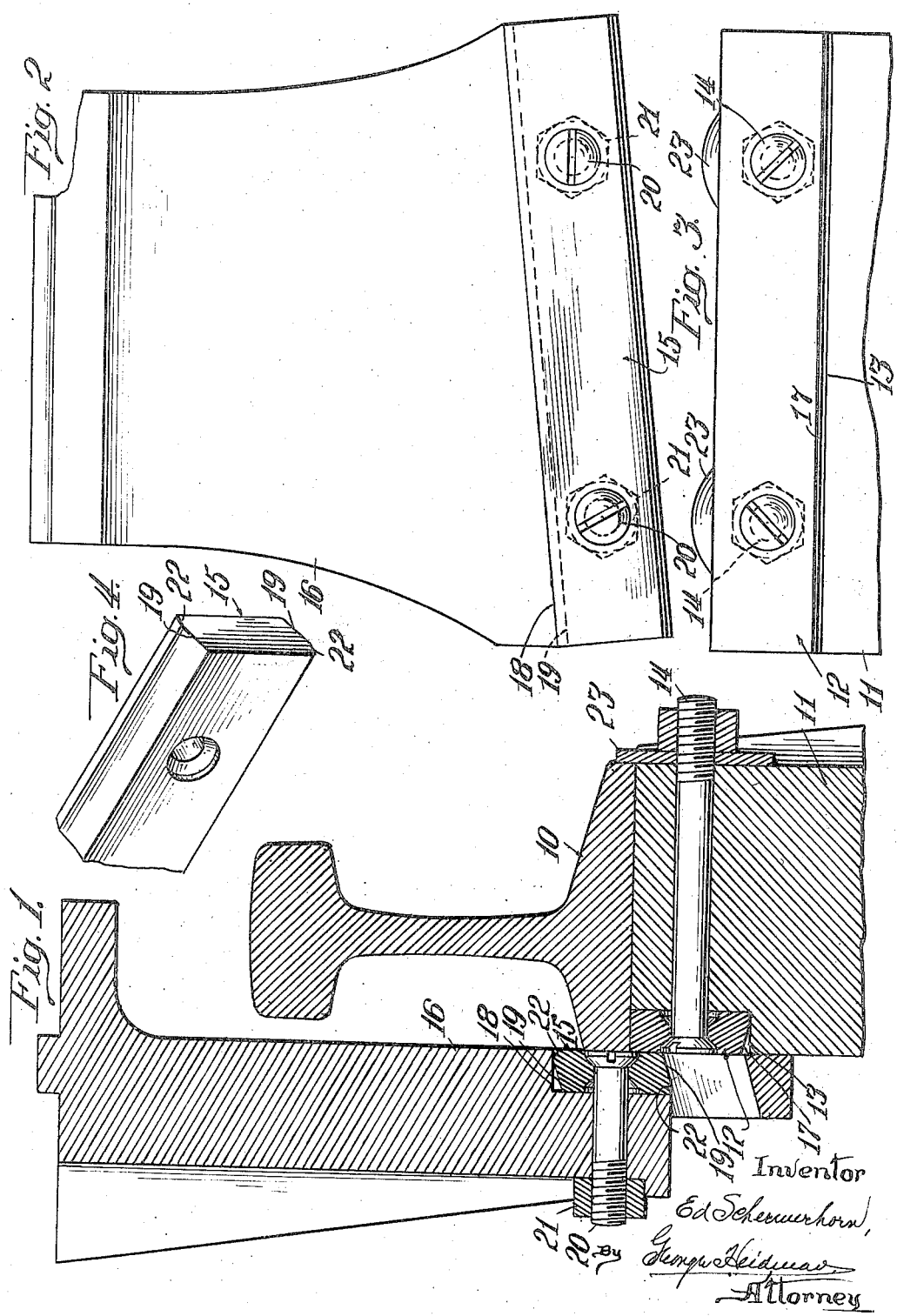
Inventor
Ed Schermerhorn,
By George Heidman
Attorney Patented Jan. 31, 1939

2,145,405

UNITED STATES PATENT OFFICE 2,145,405

SHEAR BLADE

Ed Schermerhorn, Newton, Kans.

Application April 19, 1937, Serial No. 137,731

4 Claims. (Cl. 164—58)

My invention relates to shear blades intended for use in power shears employed in cutting iron or steel sheets or bars provided with flat bottom surfaces and with angular upper surfaces; the improved blades being especially intended for shearing or cutting the base of a railroad rail; the invention having for its object the provision of a pair of blades adapted to give a more satisfactory and cleaner cut and which will also have a longer life of usefulness than is the case with the present day type of blade in use.

The construction of the blades and their objects and advantages will be readily comprehended from the detailed description of the accompanying drawing, wherein:

Figure 1 is a vertical sectional view of a portion of the top or movable head of power shears provided with my improved blade, illustrating a railroad rail on the lower or non-movable head and the upper head lowered in rail base cutting position.

Figure 2 is a side elevation of the upper or movable head and my improved blade.

Figure 3 is a similar view of the upper end of the lower or stationary head with my improved lower blade.

Figure 4 is a perspective view of one end of the top blade.

My improved blades as disclosed in the drawing for purposes of exemplification are especially intended for shearing or cutting the base 10 of a railroad rail which is supported and held in position by the lower or non-movable head 11 of a well known type of power shears; and as the invention pertains entirely to the blades, whether used in connection with vertically or horizontally disposed and moving heads, illustration of the power shears beyond the immediate blade holding portions of the heads is not deemed necessary.

The non-movable head 11 at the top and at one side is recessed transversely to receive the lower blade 12, whose lower edge or side rests on the bottom or shoulder 13 of the recess as shown in Figure 1; the blade being securely held in place by means of bolts 14, 14 which extend through the blade 12 and through the head 11; the orifices of the aperture in the blade 12 being flared as shown in Figure 1 to permit the heads of the bolts 14 to be countersunk so as to present a plain surface on the outer side or face of the blade in order not to interfere with the blade 15 carried by the upper or movable head 16.

The upper flat surface of the bottom or stationary blade 12 is preferably disposed at right angles to the direction of travel of the movable head 16, while the other or lower surface of the blade 12 is shown preferably beveled at a prearranged angle for about seventy-five per cent of its lower or cutting surface as shown at 17 in Figure 1; the purpose of this construction being later described.

The upper or movable head 16 of the power shears at its lower face and on the side disposed toward the lower head 11 during shearing operation is recessed at 18 to receive the upper blade 15; the depth of the recess 18 being such that blade 15 will be completely located within the recess, to permit it to travel adjacent to and in shearing relation with the side of the lower blade 12 and stationary head 11. Both longitudinal top and bottom surfaces of the blade 15, for about seventy-five per cent of their widths, are beveled as shown at 19, 19 to the same degree which in the specific exemplification approximates the angle of slope of the top surface of the base 10 of the rail. The blade 15 is secured to the top head 16 by suitable bolts 20, whose heads are countersunk in the flared orifices of the bolt receiving holes in the blade; the bolts extend entirely through the heads and are secured in place by nuts as at 21.

In operation the base 10 of the rail—or other metal bar to be cut—is positioned on the lower head 11 and the lower blade 12 so as to overhang the outer edge of the lower blade 12 to an extent approximating the width of metal to be removed; the base, therefore, being disposed in the path of the upper blade 15.

As shown in Figure 2, the lower end of the upper head 16 and the recess 18 therein are arranged at an inclination so that the upper blade 15 will also be at an inclination and its cutting edge successively brought into contact with the base 10 of the rail; the heads being of more or less width in order to permit use of blades of predetermined length whereby a shearing relation may be obtained.

The lower blade 12 is intended to be substantially in horizontal position as shown in Figure 3 or at right angles to the direction of travel of the movable head 16.

Beveling both longitudinal surfaces of the top blade, namely with the bevels on the two surfaces sloping from opposite side faces of the blade, it is apparent that the blade is provided with two cutting edges which permits the blade 15 to be reversed when one edge becomes dull; and by merely beveling the two surfaces for about seventy-five per cent of the entire width, proper backing or bearing surfaces are provided at 22.

Then too, by beveling the lower edge of the lower or non-moving blade 12 in a manner similar to that of the upper blade, the lower blade, in the event of dullness of both shearing edges or surfaces of upper blade 15, or said surfaces become ineffective, the lower blade 12 may be substituted for the dull or defective upper blade. The bolts 14 for the lower blade preferably are provided with large washers as at 23.

The straight upper cutting edge of the lower blade is adapted for all cutting purposes, particularly where the lower side or surface of the bar or rail to be cut is plain.

My improved shear blades are designed to give a more satisfactory cut to the base of a railroad track rail, because a cleaner cut of the base of the rail or of the material is produced and a much longer life for the blade is provided than with blades of the type at present in use which have a cutting face or edge at right angles to the vertical or horizontal travel of the movable head of power shears.

While my improved type of blade as exemplified in the drawing, is primarily designed for cutting railroad track rails, it is apparent that the blades are equally applicable for cutting iron or steel bars or elements having flat bottom surfaces and angular top surfaces and, therefore, it will be understood that I do not limit the use of the blades to track rail cutting.

What I claim is:

1. A blade of the character described composed of a metal bar of predetermined length, width and thickness, the cutting edge whereof is beveled approximately three-quarters of its width, and means whereby the blade may be secured to the movable head of the power shears.

2. A blade of the character described composed of a metal bar of predetermined length, width and thickness, the two longitudinal edges whereof for approximately three-quarters of their widths are beveled to provide a reversible shear-blade, and means whereby the blade may be secured to the movable head of the power shears.

3. A blade of the character described for shearing the base portions of track rails comprising, in combination with the movable head of power shears provided with a sloping recess, a bar of predetermined length and width coextensive with the length and depth of said recess, the two longitudinal edges of the bar being beveled approximately three-quarters of the width of said edges, the bevels being disposed in opposite directions to provide a reversible blade, the degree of the bevel approximating the slope of the rail-base, and means whereby the blade may be removably secured in said recess so as to successively approach the rail-base to be sheared.

4. A reversible rail shearing blade of the character described composed of a metal bar of predetermined length, width and substantial thickness adapted to be secured to the movable head of power shears, the longitudinal edges whereof are beveled throughout a major portion of the edges in approximation to the slope of the contacting surface of the metal element to be sheared, said major portion being adapted to contact the element during cutting operation, while the remaining portion of each longitudinal edge is substantially at right angles to the adjacent side to provide a bearing surface.

ED SCHERMERHORN.